(12) United States Patent
Gonzalez et al.

(10) Patent No.: US 10,116,716 B2
(45) Date of Patent: Oct. 30, 2018

(54) REAL TIME OPTIMIZED CONTENT DELIVERY FRAMEWORK

(71) Applicant: International Business Machines Corporation, Armonk, NY (US)

(72) Inventors: Jason A. Gonzalez, Lewisville, TX (US); Eric L. Gose, Dallas, TX (US); Mathews Thomas, Flower Mound, TX (US); Janki Y. Vora, Dallas, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 102 days.

(21) Appl. No.: 15/340,862

(22) Filed: Nov. 1, 2016

(65) Prior Publication Data
US 2018/0124142 A1    May 3, 2018

(51) Int. Cl.
G06F 15/16    (2006.01)
H04L 29/06    (2006.01)
H04L 29/08    (2006.01)

(52) U.S. Cl.
CPC .......... *H04L 65/60* (2013.01); *H04L 67/22* (2013.01); *H04L 67/306* (2013.01)

(58) Field of Classification Search
USPC .................. 709/223, 224, 231, 219
See application file for complete search history.

(56) References Cited

U.S. PATENT DOCUMENTS

| 8,418,205 B2 * | 4/2013 | Lee ............... H04N 7/17318 725/16 |
| 8,589,418 B1 | 11/2013 | Kane |
| 2002/0059588 A1 * | 5/2002 | Huber ............... G07C 9/00158 725/35 |

(Continued)

FOREIGN PATENT DOCUMENTS

| WO | 2011008626 A1 | 1/2011 |
| WO | 2014025634 A1 | 2/2014 |

OTHER PUBLICATIONS

Gonzalez, J.A. et al., "Real Time Optimized Content Delivery Framework," U.S. Appl. No. 15/846,197, filed Dec. 18, 2017, 35 pages.

*Primary Examiner* — Liangche A Wang
(74) *Attorney, Agent, or Firm* — Cuenot, Forsythe & Kim, LLC

(57) ABSTRACT

A content delivery system may receive and aggregate video content from one or more content sources. In a first embodiment, the content delivery system may start streaming a video to a first viewer on a first device and then receive a request for a catch up version to be streamed to a second viewer viewing a second device. The content delivery system may send replacement segments of the video that are shortened summaries to the second device until the second viewer has caught up to the first viewer on the first device. In a second embodiment, the content delivery system may detect two or more viewers and customize a video content for both viewers. In a third embodiment, the content delivery (Continued)

system, in real time, may customize a segment of a video (possibly using a "green screen" or overlaying a second video over the original video segment) based on characteristics of the viewer and then stream the customized video segment to the viewer.

5 Claims, 8 Drawing Sheets

(56) References Cited

U.S. PATENT DOCUMENTS

| | | | |
|---|---|---|---|
| 2005/0125732 A1* | 6/2005 | Safadi | H04N 7/163 |
| | | | 715/700 |
| 2007/0132780 A1* | 6/2007 | Garbow | G06Q 30/02 |
| | | | 345/619 |
| 2007/0136745 A1* | 6/2007 | Garbow | G06Q 30/02 |
| | | | 725/34 |
| 2007/0250901 A1* | 10/2007 | McIntire | H04N 7/17318 |
| | | | 725/146 |
| 2008/0281832 A1 | 11/2008 | Pulver et al. | |
| 2009/0300671 A1 | 12/2009 | Scott et al. | |
| 2010/0023863 A1 | 1/2010 | Cohen-Martin | |
| 2013/0145276 A1 | 6/2013 | Sathish et al. | |
| 2014/0189727 A1 | 7/2014 | Chen et al. | |
| 2016/0149980 A1* | 5/2016 | Karthikeyan | H04L 65/4076 |
| | | | 709/219 |

\* cited by examiner

| Timeline for Segments or Scenes Content |||||||
|---|---|---|---|---|---|---|
| 1 | 2 | 3 | 4 | 5 | 6 ||
|  | A |  |  | G |  ||
|  | B |  |  | H |  ||
|  | C |  |  |  |  ||
| D || E |  |  |||
| F |  |  |  |  |  ||

FIG. 3

| Viewer ID | Content Rating 1 - Language | Content Rating 2 Themes | Preferred Genre | Topics of Interest |
|---|---|---|---|---|
| Viewer 1 | R | PG-13 | Action Movies | Basketball |
| Viewer 2 | R | R | Science | Astronomy |
| Viewer 3 | G | G | Cartoons | Children |

FIG. 4

| Characteristics of Segments or Scenes ||||||
|---|---|---|---|---|---|
| Segment | Length | Content Rating | Customizable | Summary Available | Content |
| 1 | 3:37 | PG-13 | No | Yes | Comedy |
| 2 | 2:05 | R | No | Yes | Language 8 |
| 3 | :15 | G | Yes | Yes | Children |
| 4 | 1:10 | PG | No | No | Action 7 |
| 5 | 6:50 | R | No | Yes | Football |
| 6 | 3:28 | G | No | No | Romance |
| A | 2:05 | PG-13 | No | For 2 | Language 6 |
| B | 2:05 | PG | No | For 2 | Language 4 |
| C | 2:05 | G | No | For 2 | Language 1 |
| D | 1:10 | PG | Yes | For 1 & 2 | Language 4 |
| E | :45 | G | No | For 2 & 3 | Language 4 |
| F | :55 | G | No | For 1-3 | Language 2 |
| G | 5:00 | PG-13 | No | For 5 | Basketball |
| H | 4:15 | G | No | For 5 | Baseball |

FIG. 5

REAL TIME OPTIMIZED CONTENT DELIVERY FRAMEWORK

FIELD OF THE INVENTION

The present invention relates to real time optimization of content, such as video, from a content delivery system to one or more devices being viewed by one or more viewers.

BACKGROUND

Embodiments of the present invention recognize that viewers watching video content on devices has increased enormously over the past few years and video delivery companies have thrived on this growth. The video delivery companies aggregate one or more types of videos for delivery to one or more viewers. The videos may be movies, television shows and/or news broadcasts. The video delivery companies may receive preferences, such as a genre, from the viewer. The video delivery companies stream the preferred or selected videos to the viewers over a network, e.g., a local computer, satellite, Internet and/or cellular network.

SUMMARY

One embodiment of the invention allows a second viewer to catch up to a first viewer watching a video on a first device by the second viewer watching a shortened summary version of the video on a second device until the second viewer has caught up to the first viewer. Specifically, a content delivery system stores the watched video comprising a plurality of original segments and a plurality of replacement segments in a database. Each of the plurality of replacement segments is associated with at least one of the plurality of original segments. The content delivery system streams the plurality of original segments to the first device configured to be viewed by the first viewer.

While streaming the video to the first viewer on the first device, the content delivery system receives a request for a catch up version of the video to be streamed to the second device configured to be viewed by the second viewer. The content delivery system streams one or more replacement segments (shortened summaries) to the second device (and not stream the original segments that are being replaced) until the content delivery system has determined that the second device has caught up to the first device in streaming the video, i.e., the first viewer and the second viewer are watching the same part (time location) of the video.

Another embodiment of the invention allows a video to be customized for a first viewer and a second viewer for the same video at the same time. Specifically, a content delivery system stores a video comprising a plurality of original segments and a plurality of replacement segments in a database. Each replacement segment in the plurality of replacement segments is preferably associated with an original segment in the plurality of original segments.

The content delivery system replaces a first original segment in the plurality of original segments with a first associated replacement segment in the plurality of replacement segments based on a characteristic of the first original segment, a characteristic of the first associated replacement segment and a characteristic of a first viewer. The content delivery system also replaces a second original segment in the plurality of original segments with a second associated replacement segment in the plurality of replacement segments based on a characteristic of the second original segment, a characteristic of the second associated replacement segment and characteristic of a second viewer. The second viewer is a different person from the first viewer.

The content delivery system streams the plurality of original segments with the first original segment replaced by the first associated replacement segment and the second original segment replaced by the second associated replacement segment to a first device configured to be viewed by the first viewer and the second viewer. The invention thus allows the same video displayed on the same device to be customized for both the first viewer and the second viewer. While a first viewer and a second viewer were specifically discussed, a single video may be customized using this method for any number of different users.

Another embodiment of the invention modifies a segment of a video based on one or more characteristics of a viewer. In this context, modifying the segment does not mean replacing the segment with a preexisting alternative segment. In this context, modifying the segment means taking the original segment, which acts as a template, and adding or overlaying material on the original segment to thereby create a new, i.e., modified segment that is customized for the viewer.

This embodiment starts with a content delivery system storing a video comprising a plurality of segments, wherein at least one segment in the plurality of segments is configured to be customized or modified. The content delivery system streams the video comprising the plurality of segments to a device configured to be viewed by a viewer. Either before streaming the video, while streaming the video or both, the content delivery system detects a presence of the viewer. In some embodiments the system at various times detect the presence of one or more additional viewers and modify content for those additional viewers, either before or after streaming the video. Optionally, the content delivery system receives a plurality of characteristics of the detected one or more viewer.

The content delivery system customizes the at least one segment in the plurality of segments configured to be customized based on at least one of the plurality of characteristics of the detected viewer so that the customized at least one segment is streamed to the device configured to be viewed by the viewer in place or instead of the uncustomized original segment.

BRIEF DESCRIPTION OF THE DRAWINGS

FIG. 3 is a table illustrating original segments 1-6 and replacement segments A-H (shortened summaries) of a video, where the replacement segments A-H may replace original segments 1-6 to alter the length or content of the video.

FIG. 4 is a table illustrating non-limiting example characteristics (content rating 1—language, content rating 2—theme, preferred genre, topics of interest) of viewers 1-3.

FIG. 5 is a table illustrating non-limiting example characteristics (length, rating, customizable, summary available, content) of original segments 1-6 and replacement segments A-H of a video.

DETAILED DESCRIPTION

Figure 1:
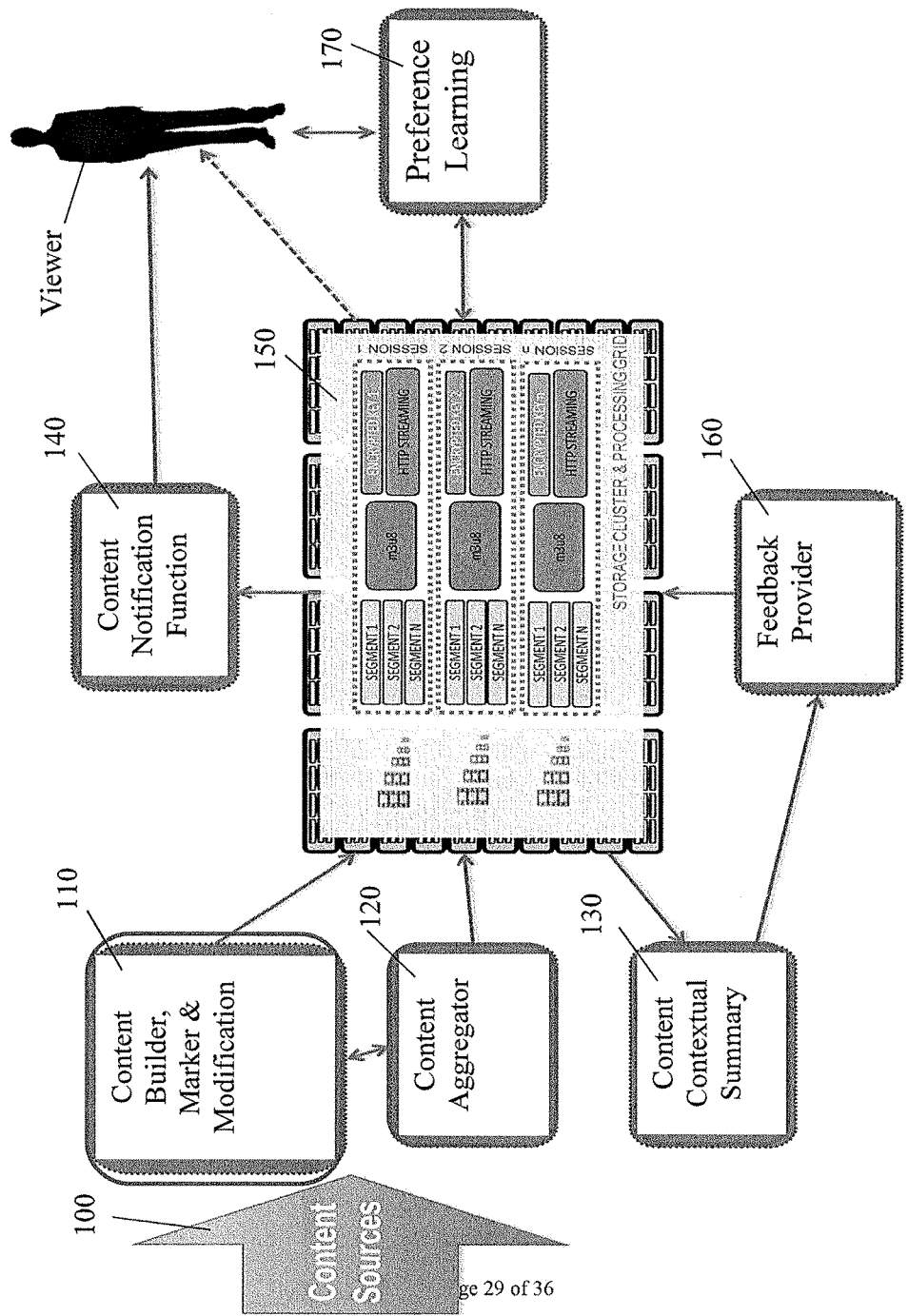
FIG. 1 is a block diagram of a system used to receive content from content sources, build, mark and modify the content, aggregate the content, store the content, create content contextual summaries, provide feedback to the system, notify the user of the content, learn preferences of the user and transmit content to the user according to the invention.

The present invention will now be discussed in detail with regard to the attached drawing figures that were briefly described above. In the following description, numerous specific details are set forth enabling one of ordinary skill in the art to make and use the invention. It will be obvious, however, to one skilled in the art that the present invention may be practiced without many of these specific details. In other instances, well-known machines, structures, and method steps have not been described in particular detail in order to avoid unnecessarily obscuring the present invention. Unless otherwise indicated, like parts and method steps are referred to with like reference numerals.

Content streamed to a viewing device, for the most part, is not personalized for the viewer(s). As an example, an adult viewer may be reluctant to stream a video with adult language or themes to a viewing device because viewers who are children at home may see it. In other cases, viewers are interested in watching a certain movie, but realize the movie is quite long so never sit down to watch the movie. In yet other cases viewers may want to watch all of the content related to a breaking news event such as an earthquake in Nepal only to find themselves switching between channels hoping that the next channel is still covering the event. What the inventors have found is a need for a system where a content delivery system can personalize or customize the content for one or more viewers.

Figure 2:
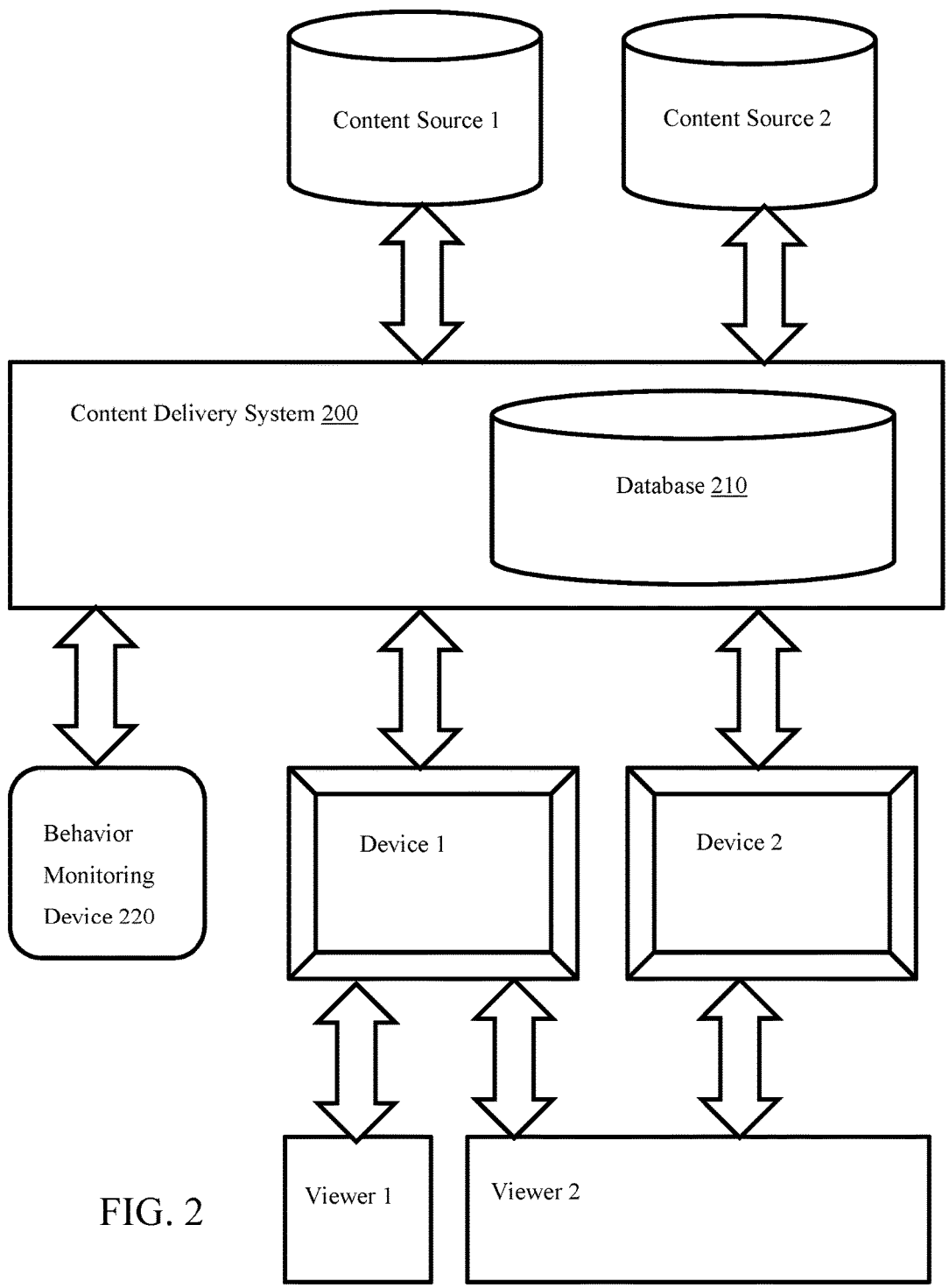
FIG. 2 is a block diagram of a system that may be used, among other things, to allow a second viewer watching a video to catch up to a first viewer, customize a video based on two different viewers and customize a segment of a video in real time based on a viewer.

FIGS. 1 and 2 are block diagrams of an example embodiment of the present invention for a content delivery system 200 to customize or personalize video content for one or more viewers. The content delivery system 200 comprise a content builder, a marker & modification (CBMM) function 110, a content aggregator function 120, a content contextual summary function 130, a content notification function 140, a storage cluster & processing grid 150, a feedback provider function 160 and a preference learning function 170.

The content delivery system 200 receives video content from one or more content sources 100 (content source 1 and content source 2 in FIG. 2). Content sources 100, content source 1 and content source 2 are any desired source of video content, such as, as non-limiting examples, a database of movies, television channels (both live and recorded), viewer or publicly recorded videos, news broadcasts (both live and recorded) and/or business recorded videos.

The CBMM 110 breaks each video down into a plurality of scenes or segments. The CBMM lists the scenes or segments in one or more tables, such as the tables illustrated in FIGS. 3-5. The CBMM 110 stores the broken down videos and tables in the storage cluster & processing grid 150.

The content aggregator 120 sorts through the broken down videos and combines or aggregates scenes or segments of videos having similar content. This allows the content delivery system 200 to stream a combination of videos to the viewer on any topic requested by the viewer. In some embodiments, a video is a composite or aggregate of a plurality of videos received from a plurality of sources that are related in some manner. As non-limiting examples, two or more videos are combined that are related to a sporting event, a specific actor or actress, a historical event being covered by one or more news channels, a geographical location or a topic of interest to a viewer.

The content contextual summary 130 analyzes each scene or segment in a video as broken down by the CBMM, and creates a summary for the scene or segment. The content contextual summary 130 may identify known objects, actors or actresses in the video or parse the audio for known words. The content contextual summary 130 uses the identified objects, actors or actresses, or words to determine a summary for the scene or segment of the video. The content contextual summary 130 stores the summary in one or more tables.

The content notification function 140 reviews one or more tables in the storage cluster & processor grid 150 and notifies the viewer of the videos that are available for viewing, possibly after being requested for the information from a viewer.

The storage cluster & processing grid 150 preferably stores a plurality of videos that are broken down into scenes or segments. The storage cluster & processing grid 150 is able, in real time and while streaming a video, to replace one or more segments within the video with replacement segments and/or customize one or more segments of the video.

The feedback provider 160 collects data regarding the viewing habits of the viewer. As non-limiting examples, the feedback provider 160 notices one or more genres or topics that interest each viewer and one or more genres or topics that do not interest each viewer. The feedback provider may use motion sensors, video and/or audio devices to record the actions of the viewers (or monitor Internet usage or social media platforms) to determine which scenes or segments of the videos were of interest to each viewer.

The preference learning function 170 collects the data from the feedback provider 160 or takes data entered by one or more viewers regarding preferences and determine which scenes or segments in a video are more likely to be of interest to each viewer.

As defined herein, the term "device" means a processing system, including at least one processor and memory, with which a viewer directly interacts, which includes at least one transceiver. Non-limiting examples of a device include, but are not limited to, a smart phone, a personal digital assistant, a tablet computer, a mobile computer, a smart watch, a monitor or any device that receives television signals and reproduces them on a screen.

As defined herein, the term "real time" means a level of processing responsiveness that a viewer or system senses as sufficiently immediate for a particular process or determination to be made, or that enables the processor to keep up with some external process.

As defined herein, the term "automatically" means without the intervention of a viewer.

As defined herein, the term "viewer" means a person (i.e., a human being) watching or viewing a video on a device.

The content delivery system 200 comprises wired or wireless receivers, possibly connected to the Internet, the public switched telephone network, cellular network, dedicated data lines or other computer network, for receiving video content from one or more content sources. In FIG. 2, a content source 1 and a content source 2 are illustrated, but any desired number of different content sources may be used in practicing the invention. The content delivery system 200 also comprises wired or wireless transmitters, also possibly connected to the Internet, the public switched telephone network, cellular network or other computer network, for communicating video content to one or more devices that may be viewed by one or more viewers. In FIG. 2, a device 1 and a device 2 are illustrated, but any desired number of different devices may be used in practicing the invention.

The content delivery system 200 also comprises a database 210 for holding and storing video content either received from the one or more content sources or created, modified and/or customized by the content delivery system 200. The video are broken into smaller scenes or segments with characteristics of each scene or segment stored in the database. FIG. 5 illustrates a non-limiting example of a table stored in the database 210 that provides characteristics for each scene or segment in the video associated with the table. As an example, the table in FIG. 5 shows that segment 1 has a length of 3 minutes and 37 seconds, has a content rating of PG-13, is customizable, has an available summary and that the content of segment 1 is primarily a comedy. The example table stores characteristics for original segments 1-6 and replacement segments A-H. The invention is not limited to these specific characteristics or the provided order. Any desired characteristics for the segments of the video may be used.

Referring to FIG. 4, the database 210 (or a different database) is used to store information or characteristics of one or more viewers. As non-limiting examples, the characteristics of each viewer may comprise a parent-set maximum content rating(s), a scale of preferred genre (action first, comedy second, romance third, news fourth), hobbies, preferred actors or actresses, preferred level of detail (general description thru highly detailed) for a given topic, specific topic areas of interest and/or specific geographic areas of interest. The more characteristics for each viewer 1-3 that are known, the better the content delivery system 200 is able to customize the video content for the one or more viewers 1-3.

In some embodiments, the characteristics of the viewers are collected and stored in a database 210 using any desired method. As non-limiting examples, the characteristics of each viewer may be self-reported by the one or more viewers, collected by scraping information from one or more social media platforms used by the one or more viewers and/or collected over time by monitoring the behaviors of the one or more viewers using the content delivery system 200.

During use, the content delivery system 200 receives selections from one or more viewers regarding different videos that the one or more viewers desire to watch. The content delivery system 200 stores, as non-limiting examples, the genre, rating and/or viewing time of the selected video for each viewer. Thus the content delivery system 200 is able to determine over time that a viewer who often selects action movies, but never selects romance movies, prefers action movies over romance movies.

In some embodiments, the content delivery system 200 also uses a behavior monitoring device 220, possibly comprising a motion sensor or a video camera and a microphone, which monitors one or more viewers' behaviors during the video and records the behaviors in a database for each viewer. As an example, the behavior monitoring device 220 may detect that a first viewer fell asleep, while a second viewer was concentrating on the video (determined by detecting a laugh or scared reaction at an appropriate time in the video) and a third viewer was only passively interested in the video (determined by detecting discussions unrelated to the video by that viewer with other viewers). By monitoring and storing the behaviors of one or more viewers over time, new videos may be selected or customized based on the viewers' stored characteristics.

A Method for a Second Viewer to Catch-Up to a First Viewer of a Video

Figure 7:
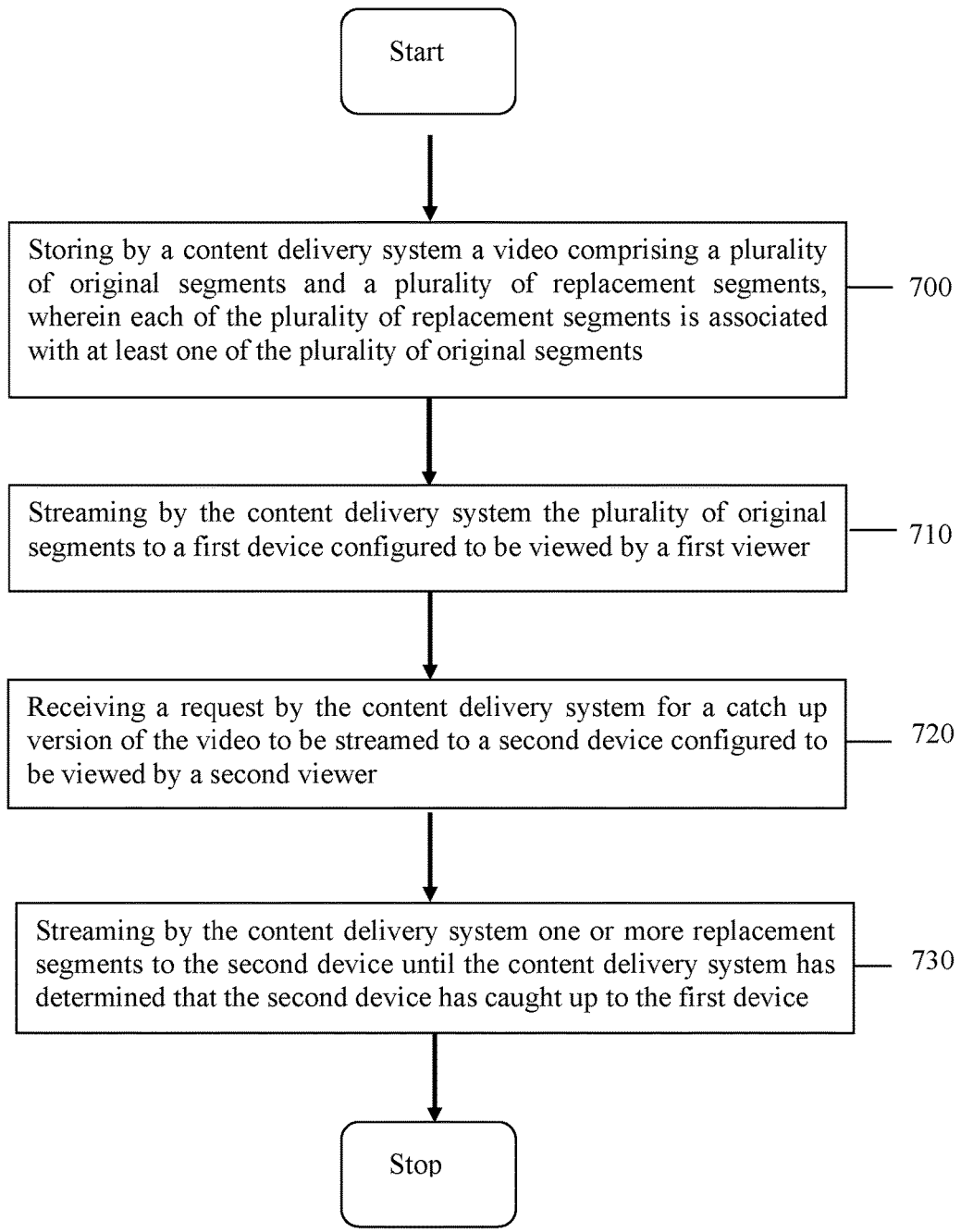
FIG. 7 is a flowchart of a method for allowing a second viewer watching a video on a second device to catch up to a first viewer watching the video on a first device.

In an embodiment of the invention illustrated in FIG. 7, a first group of one or more viewers is watching a video comprising a plurality of original segments on a first device. The content delivery system 200 streams the video. (Step 710) After the video has already started, a second group of one or more viewers may want to join the first group in watching the video. The content delivery system 200 receives a request from the second group for a catch-up version of the video to be displayed on a second device. (Step 720) The present invention has an advantage over prior art methods by allowing the first group to continue watching the video on the first device while the second group watches one or more shortened summary segments on the second device until the video on the second device catches up to the video on the first device. (Step 730)

FIG. 3 and FIG. 5 illustrate an embodiment where the content delivery system 200 store a video comprising a plurality of original segments (1-6) and a plurality of replacement segments (A-H) in a database 210. Each of the plurality of replacement segments (A-H) is associated with at least one of the plurality of original segments (1-6). (Step 700) As illustrated in FIG. 3, replacement segment F is associated with original segments 1-3. If original segments 1-3 last 20 minutes, but replacement segment F only lasts 5 minutes, but comprises a content summary of original segments 1-3, then replacement segment F is viewed on the second device to the second group to catch-up to the first group by 15 minutes. Any number of replacement segments may be viewed on the second device by the second group in place of the original segments until the second group has caught up to the first group watching the video on the first device. Once caught up, the second device can be shut off or the second device may start receiving only the original segments from then on.

In an alternative embodiment, one or more viewers may desire to watch a shortened version of a video. The one or more viewers may select a desired viewing time for the video. As an example, a movie may take 2 hours to view all of the original segments of the video, but the one or more viewers may select a viewing time of 1 hour. The content delivery system 200 replaces one or more original segments with one or more replacement segments so that the viewing time of the video, instead of being 2 hours, is now about 1 hour. In a preferred embodiment, original segments that are iconic for the movie or are determined to be more likely to be liked by the one or more viewers are kept while one or more original segments that are less likely to be liked by the one or more viewers are replaced by one or more shortened summary replacement segments.

A Method to Customize a Video for a Plurality of Viewers

Figure 8:
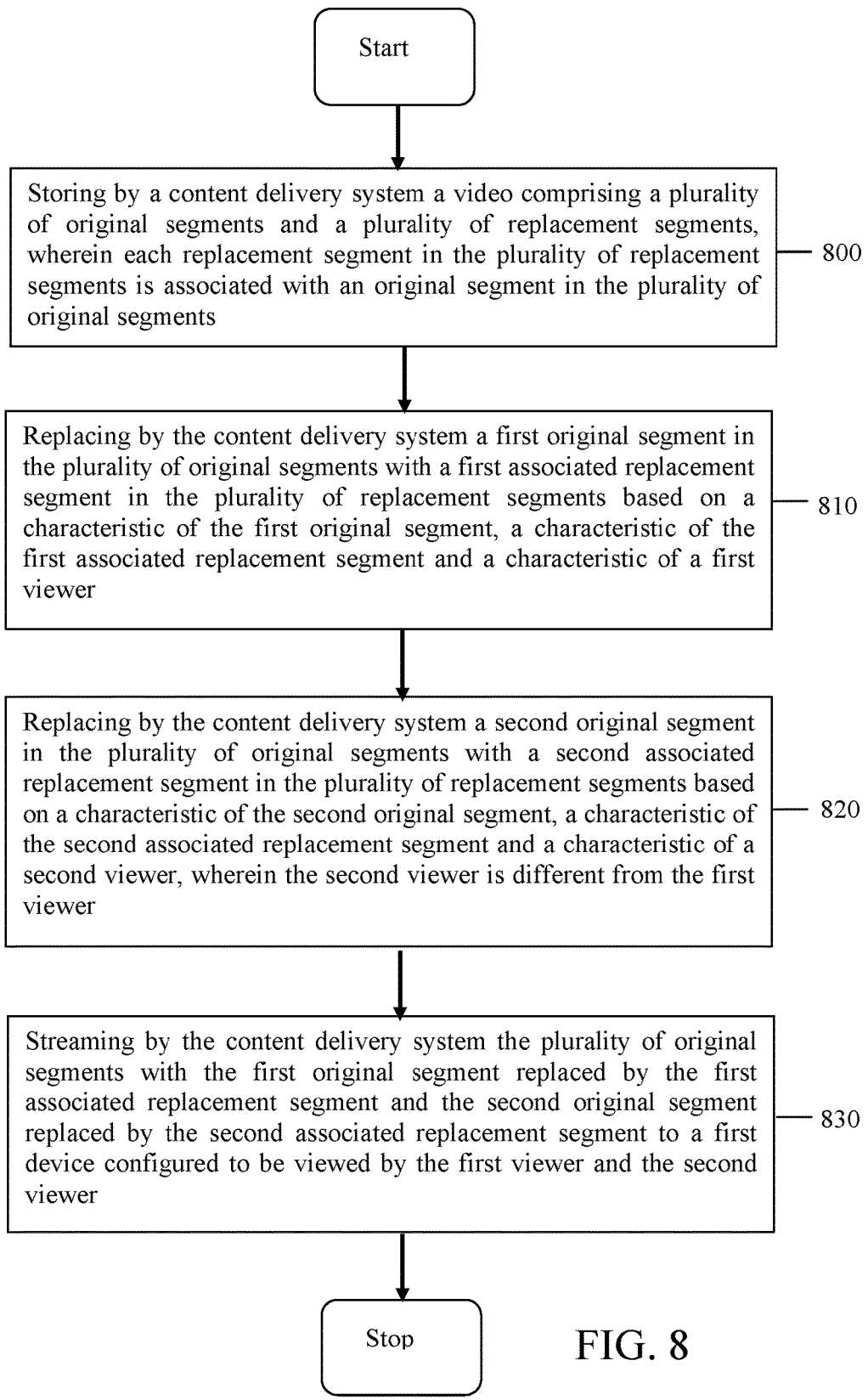
FIG. 8 is a flowchart of a method for replacing one or more segments in a video based on detected preferences of one or more viewers of the video.

In an embodiment illustrated in FIG. 8, the content delivery system 200 can customize a video for a plurality of viewers. Referring to FIG. 4, one or more characteristics of each viewer are determined from, as non-limiting examples, self-reporting, parent-reporting, scraping one or more social media platforms for a corresponding one or more viewers and/or monitoring viewing habits of the one or more viewers. The characteristics for each viewer are, as non-limiting examples, a content advisory rating 1—language, a content advisory rating 2—theme, preferred genres and/or topics of interest that are stored in a database 210.

While only four viewer characteristics are illustrated in FIG. 4, the more characteristics collected and stored, the more robust the content delivery system 200 for customizing videos and/or segments of a video for the detected viewers. In a preferred embodiment, the content delivery system 200 detects the current viewers and, if possible, video content that is above the lowest content advisory rating for any of the current viewers is either removed or replaced with video content that is appropriate for all of the detected viewers. The video may be modified or customized in real time while other parts of the video are streamed to the viewers.

In some instances, a video may be customized based a single viewer (such as removing or modifying inappropriate content with content appropriate for the youngest viewer or for a viewer who prefers milder content) or based on a plurality of viewers. As an example, if more viewers prefer action over romance, then video with action may be preferred by the content delivery system 200 and streamed instead of video with romance to the plurality of viewers.

As new viewers enter or previous viewers leave the viewing area, the content delivery system 200 may determine in real time the preferences of the new viewers and the video may be automatically modified in real time, while being streamed to the viewing device, to adjust to the new viewers. The content delivery system 200 may automatically take these actions without a specific action being taken by any of the one or more members of the group of viewers.

In an embodiment illustrated in FIG. 3 and FIG. 4, a content delivery system 200 stores a video comprising a plurality of original segments (1-6) and a plurality of replacement segments (A-H) in a database 210. Each replacement segment in the plurality of replacement segments (A-H) is associated with an original segment in the plurality of original segments (1-6). (Step 800)

The content delivery system 200 replaces a first original segment in the plurality of original segments (1-6) with a first associated replacement segment in the plurality of replacement segments (A-H) based on a characteristic of the first original segment, a characteristic of the first associated replacement segment and/or a characteristic of a first viewer. (Step 810)

As a specific example, the content delivery system 200, possibly via a behavior monitoring device 220, detects the presence of viewer 3. The content delivery system 200 determines that original segment 2 is due to be streamed to viewer 3, but original segment 2 may have a content rating of R while viewer 3 may have a maximum content rating of G. The content delivery system 200 determines that replacement segments A, B and C are available, but only replacement segment C has the same or a lower rating for content as compared to viewer 3. The content delivery system 200 replaces the original segment 2 with replacement segment C so that viewer 3 receives a video of appropriate content (in this case rated G).

The content delivery system 200 replaces a second original segment in the plurality of original segments (1-6) with a second associated replacement segment in the plurality of replacement segments (A-H) based on a characteristic of the second original segment, a characteristic of the second associated replacement segment and/or a characteristic of a second viewer. (Step 820) This process anticipates that viewers 1-3 are all different people.

As another specific example, the content delivery system 200, again, possibly via the behavior monitoring device 220, detects the presence of viewer 1. The content delivery system 200 determines that original segment 5 is due to be streamed to viewer 1 (and possibly additional viewers), but original segment 5 comprises content related to football while viewer 1 has been determined to have a viewing preference for basketball. As seen in FIG. 3, original segment 5 is replaced by replacement segments G or H. As illustrated in FIG. 5, replacement segment G may have content related to basketball and, as viewer 1 prefers this, replacement segment G (with basketball content) may replace original segment 5 (with football content).

Thus, in this example, the content delivery system 200 streams the plurality of original segments with the original segment 2 replaced by replacement segment C and the original segment 5 replaced by the replacement segment G to a first device configured to be viewed by the first viewer and the second viewer. (Step 830) The replacement process occurs before and/or during the streaming of the video and, in some embodiments, occurs as viewers are detected as entering or leaving the viewing area of the viewing device.

In other example embodiments, the content delivery system 200 monitors the viewing behavior of the one or more viewers while streaming the video to the viewers. The viewing behaviors of the viewers are saved in the database 210 and associated with characteristics of the video being displayed at the time of the observed behaviors. This data may be used to determine various characteristics of each viewer and to generate the data used to create the table illustrated in FIG. 4.

In addition, if one or more viewers appear bored or are not responding to the video while the video is being streamed, the content delivery system 200 in real time and without action by any of the viewers modifies or replaces the content in the video to make the video more interesting or appealing to the viewers.

A Method to Customize a Segment of a Video Based on a Viewer

Figure 9:
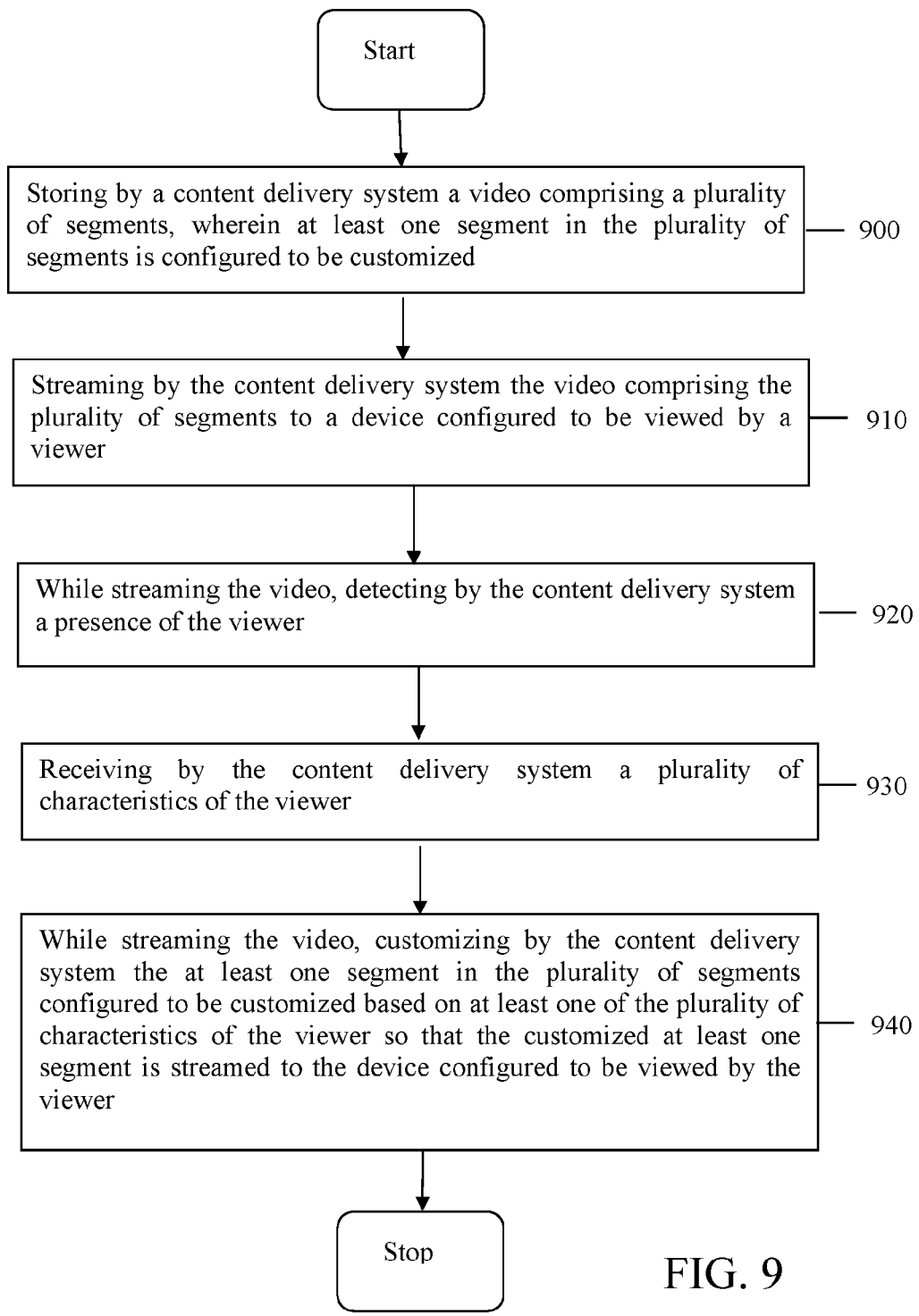
FIG. 9 is a flowchart of a method for customizing a segment in a video (not merely replacing the segment) based on preferences of one or more viewers of the video.

In an embodiment illustrated in FIG. 9, a content delivery system 200 stores a video in a database 210 comprising a plurality of segments. In this embodiment, at least one segment in the plurality of segments is configured to be customized. (Step 900) Customizing a segment does not mean replacing the segment with another already prepared segment. Customizing a segment means to take the original segment and modify the original video segment by adding video or audio to the original segment or by placing video content over the original segment, such as by using an overlay or using a "green screen" area or areas in the original customizable segment.

As specific examples, the original segment acts as a template and content (that has preferably been determined to be liked by one or more of the viewers) is added to the template. As another example, the original segment may have one or more "green screen" sections where content that has been determined to be liked by one or more of the viewers is added to the "green screen" sections of the original segments. Thus, if it is known that one of the viewers likes basketball, a basketball scene is added to a "green screen" section of a customizable original segment in the video. Of course a basketball scene may not be appropriate for every customizable segment, so a table, similar to the one illustrated in FIG. 5, is used to keep track of which segments are customizable and which customizations may be made based on the content of the original segment. This information may be created by the producer of the video.

In another embodiment, the content delivery system 200 streams the video comprising the plurality of segments to a device configured to be viewed by a viewer. (Step 910) While streaming the video, the content delivery system 200 detects a presence of the viewer. (Step 920) The content delivery system receives a plurality of characteristics of the viewer from a table similar to the table illustrated in FIG. 4. (Step 930) While the video is being streamed to the viewer, automatically and in real time, the content delivery system 200 may customize the at least one segment in the plurality of segments configured to be customized based on at least one of the plurality of characteristics of the viewer so that the customized at least one segment is streamed to the device configured to be viewed by the viewer. (Step 940)

In another embodiment, while streaming the video, the content delivery system 200 detects a topic of interest for the viewer on a different source of content. While continuing to stream the video, automatically and in real time, the content delivery system 200 customizes the at least one segment in the plurality of segments in the currently streamed video by adding an alert notifying the viewer of the topic of interest on the different source of content.

While FIGS. 2-4 only illustrate a video being broken down into six different original segments, the invention works best and has the most flexibility and power when the video is broken down into as many segments as possible. In preferred embodiments, all of the saved videos in the database 210 are organized by, as non-limiting examples, topics or ratings. There may be multiple variations of a specific scene or video segment and a producer can decide how customized the content should be. The system also aggregates content in real time from a plurality of different external sources to provide the relevant content for the video.

A user interface (preferably integrated with the viewing device) allows the viewer to interact with the content delivery system 200. In this embodiment, the viewer requests characteristics of the content about to be watched such as length, rating etc. The viewer may also request that all content related to a specific area be shown. In addition, the content delivery system 200 or original content source (broadcaster) modifies the content based on viewer responses so that the optimal viewing experience is achieved.

As another example embodiment, a viewer Joe want to watch a movie appropriate only for adults with his 10-year-old son. Joe requests the movie and notifies the system that he would like version of the movie appropriate for younger viewers. Joe also knows that his son has a limited attention span so request that a shortened version of the movie be streamed to Joe's viewing device. The content delivery system 200 may accommodate the above request by providing a shortened version of the movie and also substituting segments appropriate only for adults of the movie with segments that are more appealing and appropriate for a younger audience.

The content delivery system 200 may also know from previous viewing habits that Joe watches a lot of soccer so when it comes to a select list of sports scenes, the content delivery system 200 may replace a baseball scene in a video segment with a soccer scene in a video segment. As the video is being streamed, the system may automatically and in real time detect that Joe's son is losing interest so the content delivery system 200 may substitute an original segment with a replacement segment that includes a popular actor or content for 10 year old children.

Once the show is over Joe's son may ask Joe if he knows the latest status of a recent soccer game. Joe may request from the content delivery system 200 the latest news clips related to the soccer game and the content delivery system 200 may stream selected news clips to Joe's device.

In other embodiments, the aggregation of content for a video may be customized for a given viewer based on the viewer's perspective. For example, some viewers may want the conservation perspective, while other viewers may want a liberal perspective. Some viewers may want a complete picture of an event (e.g. detail of Nepal earthquake), others a high level view (e.g., just a 2 minute summary of key facts of an earthquake) and yet others may want just a specific or highly detailed perspective of the event (how exactly was Kathmandu affected?)

In other embodiments, the content for a video may be customized from a visual perspective. For example, a viewer may be specifically interested in what happened in a specific village during an earthquake so only videos related to that event will be shown. In other embodiments, the content delivery system may send an alert when content of interest is located in existing content being viewed or when new content becomes available on another channel so that the viewer can change to the new channel.

In some embodiments, the content delivery system 200 includes a preference learning function 170. The preference learning function 170 learns one or more of the viewers' interest based on various data sources, crowd sourcing and behavioral patterns. The characteristics of the viewer that are derived from the preference learning function 170 are used to customize the content of future videos.

In some embodiments, the content delivery system 200 or a content source includes a content marker and modification system 110. The content marker and modification system 110 permits identification and modification of content in a video so that the video can be customized. The content marker and modification system 110 may be manual, but is preferably an automated process. For instance, a scene in a video can be detected as having an adult theme and marked as such so that the scene, if desired, may be removed, modified or replaced with a scene that is appropriate for younger viewers. The content marker and modification system 110 stores the data it generates in a table similar to the tables illustrated in FIG. 3 and FIG. 5.

In some embodiments, the content delivery system 200 or a content source also includes a content contextual summary function 130 that summarizes key scenes or segments to enable catch-up or other summary related functionalities. The data generated by the content contextual summary function 130 is also stored in a table similar to the table similar to the tables illustrated in FIG. 3 and FIG. 5.

The content delivery system 200 also includes a content aggregator 120 that aggregates content from a variety of content sources 100.

In some embodiments, the content delivery system 200 also includes a feedback provider 150. The feedback provider 160 enables manual or behavioral feedback of whether the one or more viewers were happy with the content customization. The feedback is fed into a self-learning system for customization of future videos watched by the viewers. The viewer feedback is processed in order to improve the accuracy of future content customization. The viewer defines preferences up front to enhance content customization. The viewer is informed of new or changed content matching the viewer's profile.

In some embodiments, media (or video content) comes from one or more content sources into a content delivery system 200. The media may already be marked or may be further marked as part of the content delivery system 200. The content delivery system 200 may separate the media into scenes or segments and built based on the characteristics of the media. The media may be aggregated as desired.

The content delivery system 200 may place the resulting content into a grid. The grid may split the content into smaller portions (video segments) for quicker retrieval and storage. For example, if a viewer decides to view a specific portion of the content, the entire content is not streamed to the viewer, but only the portion from the grid relevant to the request from the viewer.

Once the video content is in the grid, the system creates a contextual summary similar to the table illustrated in FIG. 5.

In another embodiment, a method is provided for analyzing, parsing, and marking content so that the content is customized when provided to a viewer based on the viewer's request and the viewer's preferences. The content is input into the content delivery system 200 from various content sources, and the content delivery system 200 analyzes, parses, marks, and separates the content based on the content's characteristics. The content may be split into smaller portions or video segments to allow for quick and customized retrieval by the viewer. In response to a viewer requesting a customized version of content, the content delivery system 200 streams the relevant portions of the content to the viewer. In addition, the content contextual summary function 130 creates one or more contextual summaries that correspond to potential customized versions of the content.

Figure 6:
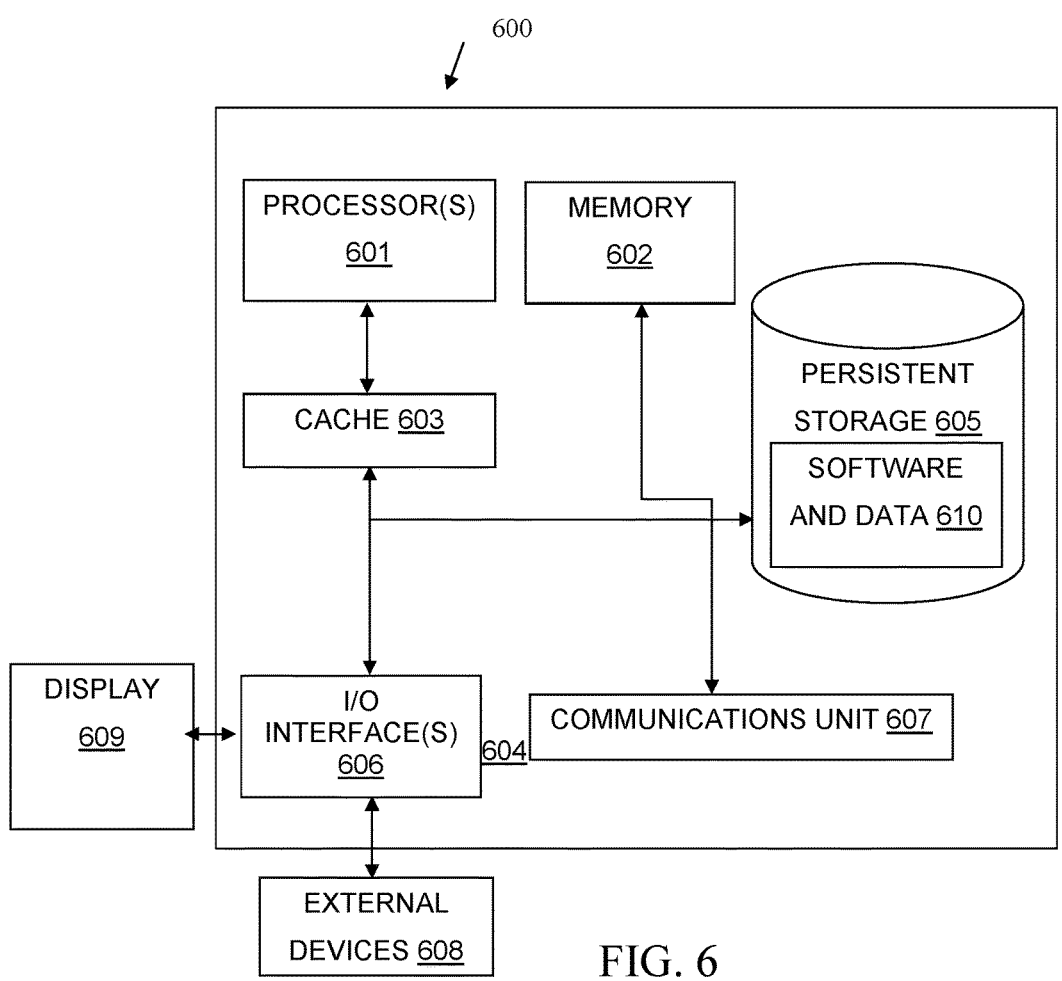
FIG. 6 is a block diagram representing a non-limiting example of a device for viewing content by a viewer.

FIG. 6 depicts computer system 600, which is representative of device 1 and device 2 and content delivery system 6200, in accordance with an illustrative embodiment of the present invention. It should be appreciated that FIG. 6 provides only an illustration of one implementation and does not imply any limitations with regard to the environments in which different embodiments may be implemented. Computer system 600 includes processor(s) 601, cache 603, memory 602, persistent storage 605, communications unit 607, input/output (I/O) interface(s) 606, and communications fabric 604. Communications fabric 604 provides communications between cache 603, memory 602, persistent storage 605, communications unit 607, and input/output (I/O) interface(s) 606. Communications fabric 604 can be implemented with any architecture designed for passing data and/or control information between processors (such as microprocessors, communications and network processors, etc.), system memory, peripheral devices, and any other hardware components within a system. For example, communications fabric 604 can be implemented with one or more buses or a crossbar switch.

Memory 602 and persistent storage 605 are computer readable storage media. In this embodiment, memory 602 includes random access memory (RAM). In general, memory 602 can include any suitable volatile or non-volatile computer readable storage media. Cache 603 is a fast memory that enhances the performance of processor(s) 601 by holding recently accessed data, and data near recently accessed data, from memory 602.

Program instructions and data (e.g., software and data 610) used to practice embodiments of the present invention may be stored in persistent storage 605 and in memory 602 for execution by one or more of the respective processor(s) 601 via cache 603. In an embodiment, persistent storage 605 includes a magnetic hard disk drive. Alternatively, or in addition to a magnetic hard disk drive, persistent storage 605 can include a solid state hard drive, a semiconductor storage device, a read-only memory (ROM), an erasable programmable read-only memory (EPROM), a flash memory, or any other computer readable storage media that is capable of storing program instructions or digital information.

The media used by persistent storage 605 may also be removable. For example, a removable hard drive may be used for persistent storage 605. Other examples include optical and magnetic disks, thumb drives, and smart cards that are inserted into a drive for transfer onto another computer readable storage medium that is also part of persistent storage 605. Software and data 610 can be stored in persistent storage 605 for access and/or execution by one or more of the respective processor(s) 601 via cache 603. With respect to device 1 and device 2, software and data 610 includes application management program and application.

Communications unit 607, in these examples, provides for communications with other data processing systems or devices. In these examples, communications unit 607 includes one or more network interface cards. Communications unit 607 may provide communications using either or both physical and wireless communications links. Program instructions and data (e.g., software and data 610) used to practice embodiments of the present invention may be downloaded to persistent storage 605 through communications unit 607.

I/O interface(s) 606 allows for input and output of data with other devices that may be connected to each computer system. For example, I/O interface(s) 606 may provide a connection to external device(s) 608, such as a keyboard, a keypad, a touch screen, and/or some other suitable input device. External device(s) 608 can also include portable computer readable storage media, such as, for example, thumb drives, portable optical or magnetic disks, and memory cards. Program instructions and data (e.g., software and data 610) used to practice embodiments of the present invention can be stored on such portable computer readable storage media and can be loaded onto persistent storage 605 via I/O interface(s) 606. I/O interface(s) 606 also connect to display 609.

Display 609 provides a mechanism to display data to a user and may be, for example, a computer monitor.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:
1. A method, comprising:
   storing by a content delivery system a video comprising a plurality of original segments and a plurality of replacement segments, wherein each replacement segment in the plurality of replacement segments is associated with an original segment in the plurality of original segments;

replacing by the content delivery system a first original segment in the plurality of original segments with a first associated replacement segment in the plurality of replacement segments based on a characteristic of the first original segment, a characteristic of the first associated replacement segment and a characteristic of a first viewer;
replacing by the content delivery system a second original segment in the plurality of original segments with a second associated replacement segment in the plurality of replacement segments based on a characteristic of the second original segment, a characteristic of the second associated replacement segment and a characteristic of a second viewer, wherein the second viewer is different from the first viewer;
streaming by the content delivery system the plurality of original segments with the first original segment replaced by the first associated replacement segment and the second original segment replaced by the second associated replacement segment to a first device configured to be viewed by the first viewer and the second viewer;
receiving by the content delivery system from the first viewer a viewing preference for the second viewer; and
replacing by the content delivery system a third original segment in the plurality of original segments with a third associated replacement segment in the plurality of replacement segments based on the viewing preference for the second viewer so that the third associated replacement segment is streamed to the device configured to be viewed by the viewers instead of the third original segment.

2. The method of claim 1, further comprising the steps of:
while streaming the video, monitoring by the content delivery system behaviors of the first viewer and behaviors of the second viewer;
associating by the content delivery system the behaviors of the first viewer and the behaviors of the second viewer with a contemporaneously streamed segment in the plurality of original segments or a contemporaneously streamed segment in the plurality of replacement segments; and
storing by the content delivery system the behaviors of the first viewer and the behaviors of the second viewer with a characteristic of the contemporaneously streamed segment in the plurality of original segments or in the plurality of replacement segments.

3. The method of claim 1, further comprising the steps of: while streaming the video, monitoring by the content delivery system behaviors of the first viewer and behaviors of the second viewer; and while streaming the video, replacing by the content delivery system a third original segment in the plurality of original segments with a third associated replacement segment in the plurality of replacement segments based on the behaviors of the first viewer or behaviors of the second viewer so that the third associated replacement segment is streamed to the device configured to be viewed by the viewers instead of the third original segment.

4. The method of claim 1, further comprising the step of:
detecting by the content delivery system a presence of the second viewer.

5. The method of claim 1, wherein
the video further comprises content from a plurality of different sources.

\* \* \* \* \*